US010124502B2

(12) United States Patent
Mühlebach

(10) Patent No.: US 10,124,502 B2
(45) Date of Patent: Nov. 13, 2018

(54) APPARATUS FOR CUTTING ELASTIC COATINGS

(71) Applicant: Proverum AG, Baar (CH)

(72) Inventor: Moritz Mühlebach, Dietlikon (CH)

(73) Assignee: Proverum AG, Baar (CH)

( * ) Notice: Subject to any disclaimer, the term of this patent is extended or adjusted under 35 U.S.C. 154(b) by 48 days.

(21) Appl. No.: 15/100,484

(22) PCT Filed: Nov. 10, 2014

(86) PCT No.: PCT/EP2014/002995
§ 371 (c)(1),
(2) Date: May 31, 2016

(87) PCT Pub. No.: WO2015/082036
PCT Pub. Date: Jun. 11, 2015

(65) Prior Publication Data

US 2016/0297089 A1 Oct. 13, 2016

(30) Foreign Application Priority Data

Dec. 2, 2013 (DE) ........................ 10 2013 018 027
Jan. 20, 2014 (DE) ........................ 10 2014 000 524

(51) Int. Cl.
*B26D 1/08* (2006.01)
*B26D 7/01* (2006.01)
(Continued)

(52) U.S. Cl.
CPC ............. *B26D 1/08* (2013.01); *B26D 1/0006* (2013.01); *B26D 7/015* (2013.01); *B26D 7/08* (2013.01); *B26D 2001/0053* (2013.01)

(58) Field of Classification Search
CPC ........................................................ B26D 1/08
(Continued)

(56) References Cited

U.S. PATENT DOCUMENTS 19,046 A 1/1858 Ruggles
804,579 A * 11/1905 Burgess ................. B23D 17/06 83/601
(Continued)

FOREIGN PATENT DOCUMENTS

EP 2298513 3/2011
WO 2007/099758 2/2007

OTHER PUBLICATIONS

PCT Written Opinion, PCT/EP2014/002995, dated Mar. 18, 2015.
PCT Search Report, PCT/EP2014/002995, dated Mar. 18, 2015.

*Primary Examiner* — Sean Michalski
(74) *Attorney, Agent, or Firm* — Andrus Intellectual Property Law, LLP

(57) ABSTRACT

An apparatus is for cutting elastic coatings, in particular floor coatings, such as luxury vinyl tiles, and/or coatings made of textiles, cork, caoutchouc, rubber, linoleum, polyvinyl chloride (PVC), and/or other plastic. The apparatus has a base with a supporting surface for supporting the coating to be cut and a blade with a cutting edge for cutting the coating. The blade is movable towards the base with the cutting edge to the fore along a guide device, which is connected to the base by way of a bracket. The apparatus is embodied in such a manner that the coating can protrude beyond the outer side of the bracket, preferably on both sides, during cutting as an extension of the cutting edge.

17 Claims, 7 Drawing Sheets

(51) Int. Cl.
*B26D 7/08* (2006.01)
*B26D 1/00* (2006.01)

(58) Field of Classification Search
USPC ............................................................ 83/697
See application file for complete search history.

(56) References Cited

U.S. PATENT DOCUMENTS

| | | | | | |
|---|---|---|---|---|---|
| 1,971,647 | A * | 8/1934 | Freeman | C14B 5/00 | 83/165 |
| 2,130,473 | A | 9/1938 | Ruau | | |
| 2,254,374 | A * | 9/1941 | Laukhuff | B23D 17/08 | 83/387 |
| 2,256,606 | A * | 9/1941 | Blanc | G03D 15/04 | 122/6 B |
| 2,270,473 | A * | 1/1942 | Porcelli | B26D 7/025 | 83/387 |
| 2,591,472 | A * | 4/1952 | Segal | B26D 1/30 | 83/389 |
| 3,077,805 | A * | 2/1963 | Stanley | B26D 7/025 | 269/233 |
| 4,010,063 | A * | 3/1977 | Natter | B29C 65/38 | 156/510 |
| 4,244,255 | A * | 1/1981 | Dykstra | B26D 5/10 | 83/629 |
| 4,688,457 | A * | 8/1987 | Neilsen | B26F 1/36 | 83/468 |
| 4,957,025 | A * | 9/1990 | Beno | B26D 1/30 | 83/468 |
| 5,214,992 | A * | 6/1993 | Mohr | B26D 7/015 | 83/157 |
| 5,249,495 | A * | 10/1993 | Renk | B26D 7/00 | 83/468.3 |
| 5,370,027 | A * | 12/1994 | Mathian | B23Q 1/262 | 83/527 |
| 5,868,055 | A * | 2/1999 | Suter | B26D 5/08 | 83/575 |
| D435,585 | S * | 12/2000 | Chiang | B26D 5/08 | D18/34.1 |
| 7,654,183 | B2 * | 2/2010 | Marks | B26D 1/08 | 30/189 |
| 2004/0089126 | A1 * | 5/2004 | McLean | B26D 1/08 | 83/605 |
| 2007/0267801 | A1 * | 11/2007 | Wakabayashi | B26D 1/08 | 270/52.17 |
| 2009/0165625 | A1 * | 7/2009 | Ishii | B26D 1/08 | 83/613 |
| 2009/0320665 | A1 * | 12/2009 | Lin | B26D 1/08 | 83/697 |
| 2010/0263512 | A1 * | 10/2010 | Zhang | B26D 1/08 | 83/628 |
| 2011/0179930 | A1 * | 7/2011 | Brown | B23D 15/14 | 83/639.1 |
| 2012/0160066 | A1 * | 6/2012 | Simmons | B26D 1/08 | 83/13 |
| 2015/0135924 | A1 * | 5/2015 | Zhang | B26D 5/16 | 83/628 |
| 2015/0143969 | A1 * | 5/2015 | Zhang | B26D 5/16 | 83/628 |
| 2015/0197982 | A1 * | 7/2015 | Lee | E06B 9/266 | 83/464 |
| 2016/0263759 | A1 * | 9/2016 | Zhang | B26D 1/085 | |

* cited by examiner

APPARATUS FOR CUTTING ELASTIC COATINGS

CROSS REFERENCE TO RELATED APPLICATIONS

This application is the U.S. national stage application of International Application PCT/EP2014/002995, filed Nov. 10, 2014, which international application was published on Jun. 11, 2015, as International Publication WO 2015/082036 in the English language. The international application is incorporated herein by reference, in entirety. The international application claims priority to German Patent Application No. DE 102013018027.9, filed Dec. 2, 2013, which is incorporated herein by reference, in entirety, and and German Patent Application No. DE 102014000524.0, filed Jan. 20, 2015, which is incorporated herein by reference, in entirety.

FIELD

The invention relates to an apparatus for cutting elastic coatings, in particular floor coatings, such as luxury vinyl tiles (LVT), and/or coatings made of textiles, cork, caoutchouc, rubber, linoleum, polyvinyl chloride (PVC), and/or other plastic.

BACKGROUND

When these types of coatings are laid, it is necessary on a regular basis to cut the individual coating elements of the coating to size. Cutting the coating elements of these types of coatings places high requirements on apparatuses which are used for cutting the coatings to size. The material of these types of floor coatings should be as resistant as possible, i.e., firm and tough. At the same time, clean cuts are supposed to be made as much as possible in order to obtain a flooring surface that is as closed as possible when the properly cut pieces are abutted. In doing so, these types of apparatuses should be useable on-site when the flooring is being laid, which means that there are limitations related to the size and weight of these types of apparatuses.

An apparatus of the type under discussion is disclosed in EP 2 298 513 A1. The apparatus has a base, which provides a supporting surface for supporting the coating or coating element to be cut. A blade is provided to cut the coating or the coating element, which can be moved by suitable guide means with the cutting edge thereof towards the base. The guide means are arranged on both sides of the blade in a vertical plane with the cutting edge. The guide means are connected to the base via brackets. An actuating device is provided in order to be able to apply the forces to the blade that are required for cutting the coating or coating element. The actuating device has a lever in order to be able to exert sufficiently high forces via the blade on the coating or the coating element. The brackets are thereby used as abutments in order to absorb the reaction forces, which result from the forces exerted on the blade from the lever mechanism for cutting the coating.

The disadvantage of an apparatus of the described design is that, because of the brackets or guide means arranged on both sides of the cutting edge, the dimensions of the coating that can be accommodated in such an apparatus for cutting are limited. In particular, this means that coating sections or elements cannot be cut with such an apparatus along edges that exceed a certain length. In order to make cutting on-site possible with such an apparatus, the coating must already be present in sections or coating elements, whose edge lengths do not exceed a length predetermined by the apparatus. Rectangular coating sections that have different edge lengths can normally only be cut along their shorter edges.

SUMMARY

The object of the invention is to provide an apparatus for cutting elastic coatings, which has a greater flexibility with respect to the possible cutting pattern and nevertheless, at the same time, features a compact design and a low weight.

In the case of the apparatus of the type mentioned at the outset, it is provided according to the invention that the apparatus is embodied in such a manner that the coating can protrude beyond the outer side of the bracket during cutting as an extension of the cutting edge. Inasmuch as the expression "coating" is used in the following, it is taken to mean not only the coating as such, but also an individual coating element or a plurality of coating elements for a coating. Due to the aforementioned design of the apparatus according to the invention, it is possible to make cuts along the edges of elastic coatings even if the edges of the elastic coatings are longer than the width of the cutting edge or the width of the region beneath the cutting edge, which is limited by the bracket. In order to use the apparatus according to the invention to cut a coating, the edge length of which is longer than the length of the cutting edge, it is merely necessary to displace the coating on the supporting surface and make another cut and, if applicable, a plurality of additional cuts as an extension of the cut that has already been made. Of course, it goes without saying that the apparatus according to the invention can also be used to cut coatings or coating elements on the short sides thereof without a problem.

Whereas in conventional, known apparatuses, the bracket is arranged in the vertical plane of the cutting edge, in particular for reasons of better rigidity, the apparatus according to the invention utilizes the effect, as was surprisingly shown, that it is possible to guarantee adequate rigidity of the overall design without having to arrange the bracket directly in the vertical plane of the cutting edge.

Structurally, the design of the apparatus according to the invention for cutting elastic coatings is made possible in that the apparatus has a free space for accommodating the coating. Said free space is preferably arranged between the bracket and the base and/or between the guide device and the base. The free space is thereby located in particular on the plane of the supporting surface and preferably as an extension of the blade. The free space makes it possible to arrange coating elements, the length of which is clearly greater than the length of the blade, on the supporting surface and cut them. When cutting an elongated coating element on the long side thereof, the coating element then protrudes to some extent on both sides, i.e., on both side surfaces as an extension of the blade, beyond the apparatus according to the invention.

To make it possible to also be able to cut coating strips with a certain width without a problem, the supporting surface has a correspondingly adequate width and the free space has a correspondingly adequate depth of at least 5 cm, in particular of up to 50 cm. Every individual value of the depth of the free space within the aforementioned range is thereby fundamentally possible.

The free space can be realized in particular by a recess in the bracket. The bracket then has a cross section with an opening arranged in the extension of the cutting edge. Depending on the design of the bracket and base and, in particular, depending on the arrangement of the connection between the bracket and the base, the opening can also be limited by the bracket and a region of the base connected to the bracket.

The bracket preferably has a C-shaped cross-sectional region when viewed in the longitudinal direction along the cutting edge. A C-shaped cross-sectional region should be understood in particular as a cross section, which defines a free space towards one side, which is limited in the vertical direction by the bracket. Depending on the arrangement of the connection between the bracket and the base, it is likewise possible and advantageous that the C-shaped cross section is defined by the bracket and a region of the base connected to the bracket.

It goes without saying, in the case of the component connections between the bracket and base that are described as examples in the aforementioned and subsequently, that the invention is not restricted in any case to these types of designs. In particular, it is of course also possible to configure the brackets and base to be one piece or to configure parts which are assigned to the base due to their function and/or structural arrangement as one piece with the bracket.

It is especially advantageous if the design of the apparatus according to the invention that makes it possible for the coating to protrude beyond the outer side of the bracket on both sides as an extension of cutting edge is realized. A symmetrical design is thereby possible, the advantage of which is that right-handed and left-handed people are faced with the same conditions related to operability.

In addition, an asymmetrical design of the apparatus according to the invention, which is by all means possible, has the advantage that the apparatus can be optimized with respect to its combination of rigidity, on the one hand, and the possibility of being able to handle the most varied cutting tasks possible, on the other hand. Thus, for example a bracket can be designed horizontally to be C-shaped and the opposing bracket along the cutting edge in a conventional manner in the plane of the cutting edge.

The supporting surface can preferably be expanded. This applies in particular to the region of the supporting surface as an extension of the cutting edge. The region of the coating protruding beyond the outer side of the bracket during cutting can be supported in this manner, which means there are advantages in terms of handling. Above all when the coating is supposed to protrude far over the outer side of the bracket, it is advantageous to make an additional supporting surface available for the coating as an extension of the cutting edge.

It is especially advantageous that the concept of an expandability of the supporting surface produces an enlargement of the apparatus only temporarily, specifically when the supporting surface is situated in the expanded state. This can be realized structurally for example by an extension module, which can be detachably connected to the base. Such an extension module can then just be mounted on the apparatus as needed. When the extension module is no longer needed, it can be dismantled again at any time. This prevents the extension module from having an interfering effect, for example when transporting the apparatus. Instead of a separate extension module, which can be mounted on the apparatus, it is also fundamentally possible to provide a folding wing on the base, i.e., on each of the side surfaces, which can be fixed in the folded state. The upper side of the folding wing then expands or enlarges the supporting surface. The folding wing can be folded out temporarily and be appropriately fixed. If the folding wing is not needed, it can then be folded down so that it rests with its lower side on the side surface of the base. This produces a space-saving arrangement.

To guarantee a simple and cost-effective structure of the apparatus according to the invention, it is advantageous if the base has at least one profile rail, in particular one aluminum profile rail. The use of profile rails makes a light and rigid design of the base possible. In addition, the profile rails are relatively cost-effective components, something which has a positive effect on the production costs of the apparatus according to the invention.

Furthermore, it is advantageous that such a profile rail can be equipped with a groove or a similar connecting element or receiving means. The connecting elements facilitate, firstly, the simple connection of the profile rails among one another, and secondly, the fastening of other components of the apparatus to the profile rails is possible in a simple manner.

In particular, the connection between the bracket and these types of profiles can be designed to be mountable in a simple manner so they are rigid and nevertheless light. To this end, the bracket can preferably have a connecting region that is designed to be complementary to the profiling of the profile rail. The region can be brought into engagement with the profile rail, for example on the profile rail, preferably slid on or inserted into the profile rail on the face side. It is then preferably possible to secure the bracket on the profile rail using a detachable component connection, for example a screw.

The supporting surface can likewise be realized in an advantageous manner in connection with a profile rail. The apparatus preferably has a flat element forming the supporting surface. The flat element can be a sheet metal, for example. A profiling to accommodate the flat element is preferably provided on a profile rail. Two profile rails are preferably arranged on opposite sides of the flat element. The profile rails preferably run parallel to each other and/or at a right angle to the cutting edge. The profile rails that are connected to each other then ultimately form a support frame for the base of the apparatus according to the invention. Such a structure of the base incidentally facilitates in an advantageous manner the design of the different construction sizes of the apparatus according to the invention. In particular, different surface dimensions of the supporting surface can be realized in a simple manner. The profile rails can be properly cut to the respectively required length. The flat element can be can be cut out of or to size from flat semi-finished materials.

It goes without saying that the idea of the structure of the apparatus according to the invention when using profile rails and flat elements is not restricted to the structure having two profile rails arranged on the outside of the flat element. Of course, it is possible for the flat element to project over the profile rail, and it is likewise possible for at least one other profile rail to be provided, in particular to strengthen or reinforce the base.

A further advantage of using profile rails is that it makes a simple temporary extension of the supporting surface possible with extension modules, for example by using a groove provided in the profile rail.

The base preferably has a limit stop to the horizontal alignment of the coating. Such a limit stop is arranged in particular on the supporting surface and/or in the region of the supporting surface. The limit stop is preferably oriented parallel and/or at a right angle to the cutting edge, wherein a plurality of limit stops can be present.

Such a limit stop first of all facilitates the horizontal positioning or alignment of the coating to be cut relative to the cutting edge. The limit stop is thereby preferably adjustable and/or detachable. In particular, adjustable or detachable limit stops, which can be fastened to different positions on the apparatus, have the advantage of making a plurality of different possible alignments of the coating relative to the cutting edge possible.

A limit stop is advantageous in particular when a plurality of cuts having the same dimensions is supposed to be made in succession. In such a case, the limit stop can be adjusted or mounted in the desired position once so that the correct position of the coating is provided for the cutting operation that is to be repeated, whereupon a plurality of coatings is cut one after the other in series.

To reduce material stresses in the coating during cutting, the supporting surface in particular has a step or chamfer following the cutting edge, and specifically behind the cutting edge in the depth of the free space. The step/chamfer makes it possible for the coating to tilt during cutting or to bend along the cutting edge.

Because the blade penetrating into the coating gets thicker away from the cutting edge, the coating material must give way in the immediate vicinity of the cut of the blade penetrating into the coating with an increasing penetration depth. This results in stress in the material. It is desirable to keep said stress as low as possible to prevent plastic material deformations in the region of the cuts for example.

Because the apparatus is embodied in such a manner that the coating can bend during cutting along the cutting line, the coating is able to yield and give way to the stress arising from the cutting process so that plastic deformations are prevented or at least can be reduced.

The apparatus according to the invention preferably has a limit stop element on the supporting surface, on which the cutting edge comes to rest at the end of its cutting movement. The limit stop element is preferably made of a material, which is firm enough to support the coating to be cut against the pressure of the cutting edge. At the same time, the limit stop element should not be too hard, because a limit stop element that is too hard would quickly produce a dull cutting edge. The limit stop element can be made of PVC for example. It is preferably embodied such that it is provided as an insert in a corresponding depression in the supporting surface.

In terms of a clean finish to the cutting process, it is desirable if the cutting edge has a parallelism that is exact as possible to the surface on which it comes to rest at the end of the cutting process. An adjustment device is preferably provided to ensure this parallelism. The adjustment device permits the parallelism to be ensured between the cutting edge, on the one hand, and the supporting surface of the limit stop element, on the other. Alternatively, it is also fundamentally possible for the cutting edge to be deliberately arranged at a very acute angle to the supporting surface so that the coating piece situated beneath the cutting edge is not cut completely over the length of the blade at the same time, rather first with an increasing cutting depth. The adjustment device can also be provided for adjusting such an acute angle.

It is possible with the apparatus according to the invention to make cuts that are longer than the cutting edge. For this purpose, after a cut has been made, the material is displaced along the cutting edge so that the cutting edge is able to make another cut which adjoins the first cut as an extension. In this way, the long cut is made up of sections.

To make these types of cuts, it is advantageous if the blade is embodied at least in the region of the ends thereof in the longitudinal direction in such a manner that the material thickness of the blade reduces towards the end of the cutting edge. This applies in particular to the material thickness of the blade in the region of the cutting edge. This measure reduces stress that arises in the coating material when the blade or the cutting edge terminates in the coating when the coating is cut.

In the case of a conventional blade, the coating material directly adjoining the end of cut is locally distended with an increasing penetration depth of the blade into the coating. This can result in plastic deformations of the material, which in the most unfavorable case are visible in the laid coating. A blade that is advantageously configured with reduced material thickness in the longitudinal direction towards its end reduces this distention of the material.

The reduction of the material thickness of the blade is preferably achieved in that, in the region of the end of blade, an additional cutting edge is or will be sharpened on the blade.

The blade runs preferably at a right angle to or at least substantially at a right angle to the cutting edge.

A restoring element for moving the cutting edge away from the base is preferably provided. The restoring element is arranged above the extension of the cutting edge. Due to the arrangement of the restoring element above the extension of the cutting edge, the restoring element is located in the movement plane of the cutting edge. This prevents a tilting of the apparatus during the cutting movement, because the forces of the restoring element act in the movement plane of the cutting edge. The restoring element is preferably a compression spring. However, it is also possible to provide a tension spring. The advantage of a compression spring lies in the fact that a tilting of the blade or the blade holder from the forces initiated by the restoring element is prevented. The restoring element is preferably arranged above the free space so that the free space arranged beneath the restoring element is available for inserting the coating to be cut.

Insofar as values and/or value ranges are cited, all individual values and value ranges that lie within the value ranges are also expressly cited and are considered to be advantageous embodiments of the invention without an explicit citation of the values or value ranges being necessary in an individual case.

The present invention will be described in greater detail by the following preferred embodiments. However, the invention is not restricted in any case to the preferred embodiments. On the contrary, all described and/or visually depicted features form, separately or in any combination, the subject matter of advantageous embodiments of the present invention, independent of their recapitulation in the claims, the dependency references of the claims and/or organization of the description.

DETAILED DESCRIPTION OF THE DRAWINGS

Figure 1:
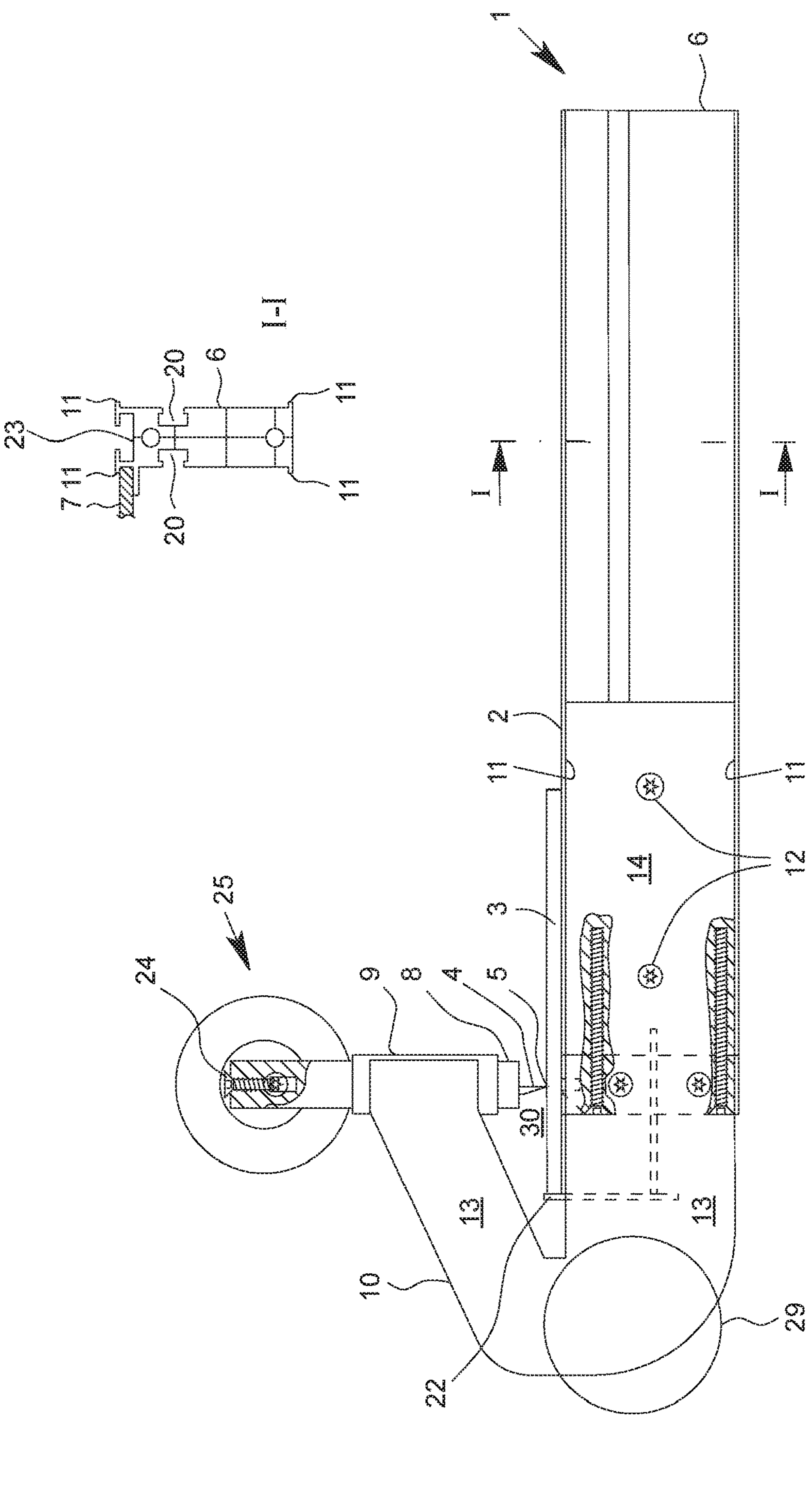
FIG. 1 A side view of an exemplary apparatus according to the invention viewed in the direction along the cutting edge.

The embodiment of an apparatus according to the invention depicted in FIG. 1 has a base 1. The supporting surface 2 is located on the upper side of the base 1. The coating 3 can rest on the supporting surface 2. In the present case "coating 3" means a separate coating element for creating a coating. A blade 4 with a cutting edge 5 is provided for cutting the coating 3. The blade 4 is sharpened on one side in the depicted example. The use of blades that are sharpened on both sides is also fundamentally possible. The use of blades that are sharpened on both sides can be advantageous, if a more uniform distribution of the material stresses is desired and when penetrating the blade 4 into the coating 3. This can contribute to preventing or reducing plastic deformations of the coating 3 from the penetrating blade 4.

The base 1 is formed of profile rails 6, which extend at a right angle to the cutting edge 5 in the depicted example, and a flat element 7 in the form of a sheet metal arranged between the profile rails 6. A partial section I-I through the apparatus is depicted in FIG. 1 to elucidate the structure of the base 1 made of profile rails 6 and a flat element 7.

The cutting movement of the blade 4 is facilitated by guide devices 8. The blade holder 9 with the blade 4 accommodated therein is displaceably accommodated on the guide devices 8. The guide devices 8 are connected to the base 1 by brackets 10. The brackets 10 are connected in turn to the base 1 such that sections 14 of the brackets 10 are arranged between the connection profiles 11 of the profile rails 6 and are fastened to the profile rails 6 by fastening elements 12. Because of the connection profiles 11, the brackets 10 receive a loadable support on the base 1 so that the reaction forces arising when cutting the coating 3 can be introduced via this rigid component connection through the brackets 10 into the base 1 and from there into the floor.

The brackets 10 depicted in FIG. 1 have a C-shaped cross section between their connections to the guide devices 8 and their connections to the base 1 when viewed in the longitudinal direction of the cutting edge 5. The regions 14 of the brackets 10 connected to the profile rails 6 in the direction along the profile rails 6 thereby connect to the lower part of the C-shaped regions 13 of the brackets 10. Due to the C-shape of the brackets 10, it is possible for the coating 3 to protrude beyond the respective outer sides of the brackets, as FIG. 3 in particular shows.

Figure 2:
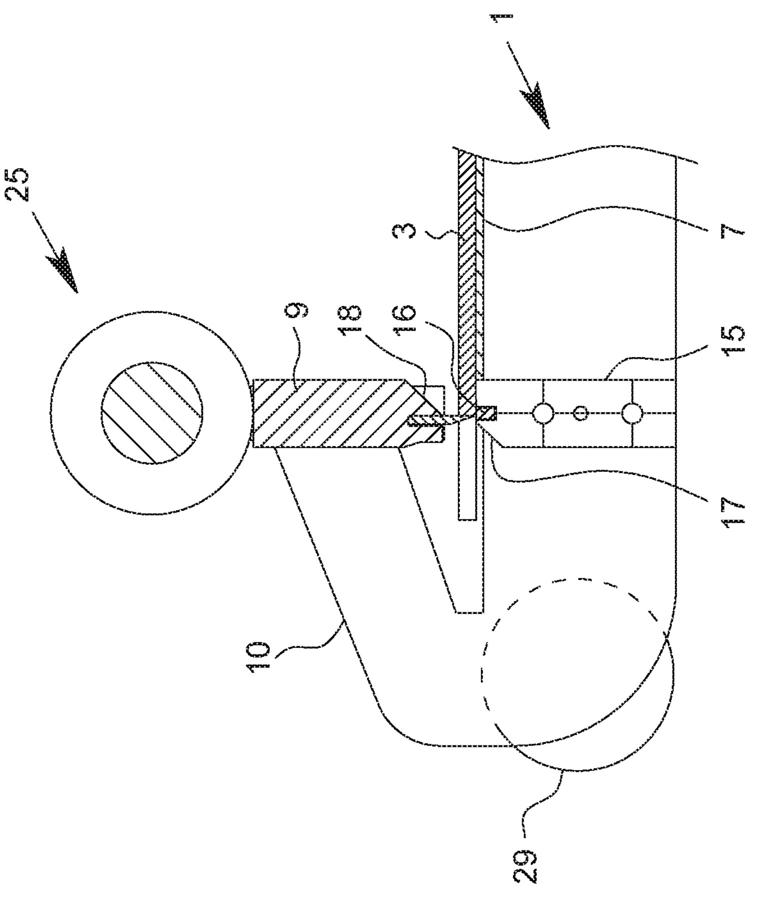
FIG. 2 A partial sectional view of the apparatus from FIG. 1 during cutting of a coating viewed in the direction along the cutting edge.

As shown in FIG. 2, a transverse profile 15 that runs parallel to the cutting edge 5 is provided in the region of the base 1. Situated at the upper side of the transverse profile 15 is a limit stop element 16 made of PVC, which serves as a limit stop for the cutting edge 5 when cutting the coating 3. Moreover, the transverse profile 15 has a chamfer 17. The chamfer 17 makes it possible to bend the coating 3 along the cutting line. This thereby reduces the material stress arising in the region of the cutting line in the coating 3, which stress is generated by the blade 4 that is getting increasingly wider away from the cutting edge 5 when it penetrates into the coating 3.

FIG. 2 also shows that the blade holder 9 has a chamfer 18. The chamfer 18 facilitates a better monitoring of the cutting process, in that it facilitates a better view of the blade 4 penetrating into the coating 3.

Figure 3:
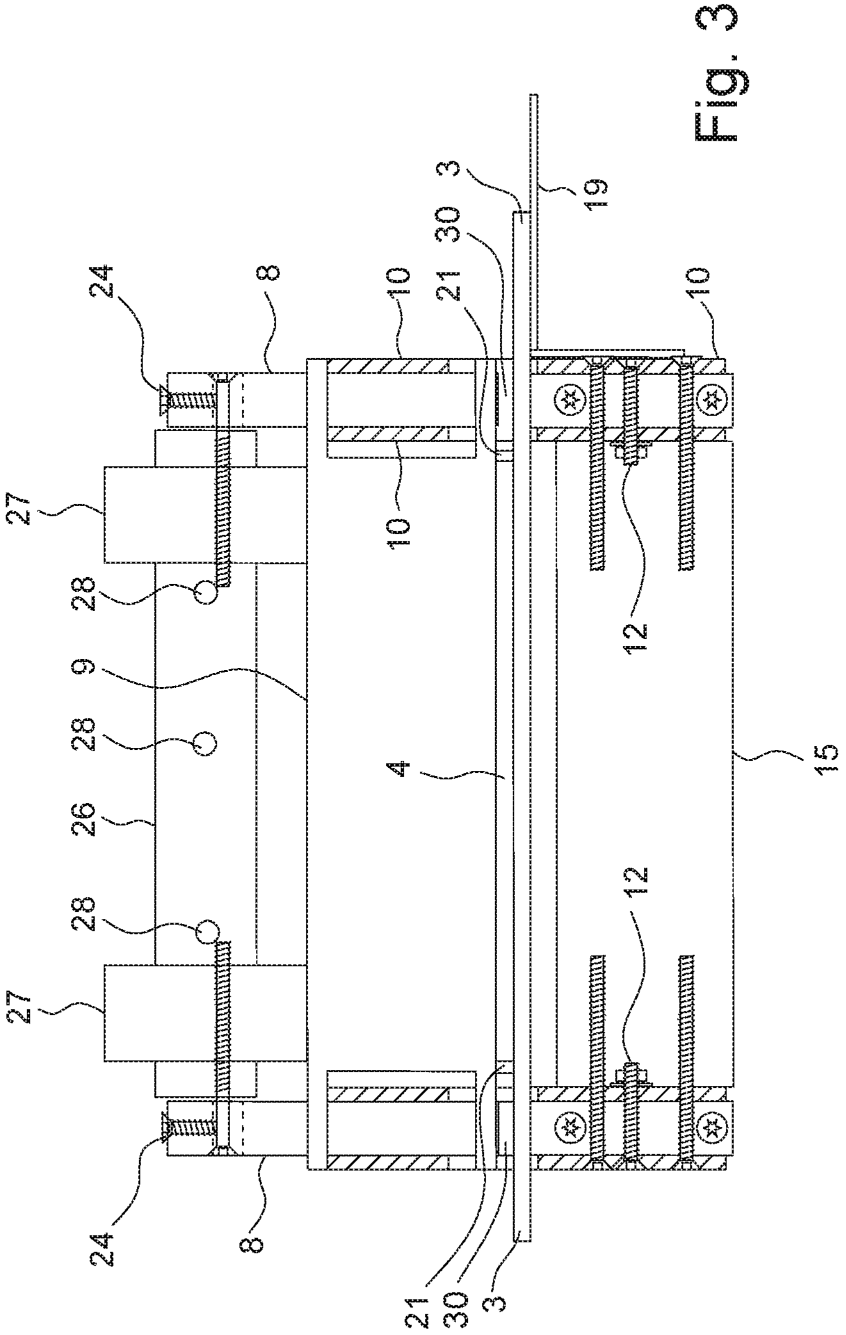
FIG. 3 A sectional view of the apparatus from FIG. 1 viewed in the horizontal direction at a right angle to the cutting edge.

The apparatus according to the invention is preferably expandable by the extension module 19 depicted in FIG. 3. The extension module 19 produces an extension of the supporting surface 2 as an extension of the cutting edge 5. In doing so, the extension module 19 is preferably detachably connected to the apparatus, in particular to the base 1 of the apparatus. To facilitate this detachable connection, corresponding connecting elements 20 can be provided on the base 1, in particular on the profile rails 6. The connecting elements 20 can be grooves in the profile rails 6, which are suitable to accommodate nuts for example.

The blade 4 is preferably equipped on one or both ends of the cutting edge 5 with an additional cutting edge 21, which runs at a right angle to the cutting edge 5. The additional cutting edge 21 is used to reduce material stress in the coating 3 from the penetrating blade 4, when the coating 3 is just cut into by the blade 4, i.e., the cutting line ends in the material of the coating 3.

Furthermore, it can also be meaningful not to configure the blade 4, as shown in FIG. 3, over approximately the entire width of the apparatus. Whereas the blade 4 depicted in FIG. 3 extends almost over the entire work area between the brackets 10, it would also be possible, for example, to use a blade 4, which extends just over half or another portion of the work area. It would also be conceivable in this connection to provide interchangeable blades. These shortened blades 4 would make additional cutting pattern variations possible. Shortened blades 4 can then be used advantageously in particular in the apparatus according to the invention if strip-like coating sections 3 are supposed to be just cut into, but not separated, transverse or at least substantially transverse to the longitudinal extension thereof.

In order to facilitate the correct alignment of the coating 3 on the supporting surface 2, the apparatus according to the invention preferably has a limit stop 22. The limit stop 22 depicted schematically in FIG. 1 extends parallel to the cutting edge 5. However, the alignment of the limit stop 22 can also be accomplished in another direction, for example at a right angle to the cutting edge 5.

It is especially advantageous if the limit stop 22 is detachably connected to the apparatus according to the invention. For example, receiving means 23, such as e.g., grooves, in the profile rails 6 can be provided for this. However, other arrangements and/or designs of these types of receiving means 23 for the limit stop 22 on the apparatus are possible. Thus, for example the flat element 7 can have slots, via which the corresponding detachable fastening elements, such as screws for example, can be guided to fasten the limit stop 22 in the region of supporting surface 2.

In terms of the arrangement of the limit stop 22 in the region of supporting surface 2 or the flat element 7, it is advantageous in particular that the limit stop 22 can be arranged transverse to and along the cutting edge 5 at any angle to the cutting edge 5 in the region of supporting surface 2. This makes miter cuts possible for example. It is especially advantageous thereby if the receiving means 23, which can be slots or grooves in particular, are designed to be curved in the region of the supporting surface 2 in order to be able to arrange a positioning of the limit stop 22 on the supporting surface 2 optionally at different angles to the cutting edge 5.

To execute clean cuts, an exact parallelism of the cutting edge 5 to the supporting surface 2 or to the limit stop element 16 is provided in the case of the depicted embodiment. To this end, at least one adjustment device 24 is provided. The adjustment device 24 is an adjusting screw in the depicted example. The screw 24 cooperates with the actuating device 25 of the device shown as an example. The apparatus according to the invention shown as an example has, as depicted in FIG. 3, two adjustment devices 24. Alternatively, it would also be possible to provide merely one adjustment device.

The actuating device 25 cooperates with the guide devices 8 and the blade holder 9. In the depicted example, the actuating device 25 is formed as a combination of an axis 26 mounted eccentrically on the guide devices 8 and two pressure disks 27 provided on the axis 26. Basically, a different number of pressure disks 27 could also be provided or the axis 26 could cooperate directly with the blade holder 9. The advantage of using the pressure disks 27 is that the friction-stressed contact surface between the blade holder 9 and the pressure disks 27 is smaller than the case would be if the axis 26 were to cooperate directly with the blade holder 9 over the entire width of the apparatus.

In the case of apparatus shown as an example in FIG. 3, a plurality of receptacles 28 for an actuating element (not shown) are provided to improve the operability. The actuating element can be a lever for example. In the simplest case, the receptacles 28 are boreholes, in which the lever can be inserted. A plurality of receptacles 28 are preferably arranged distributed along the actuating device 25 in a direction parallel to the cutting edge 5. The actuating element can then be arranged optionally in different positions along the actuating device, depending upon what the current operating situation requires. In this way, it is possible for example to allow for the different ergonomic needs of right-handed and left-handed people.

Figure 4A:
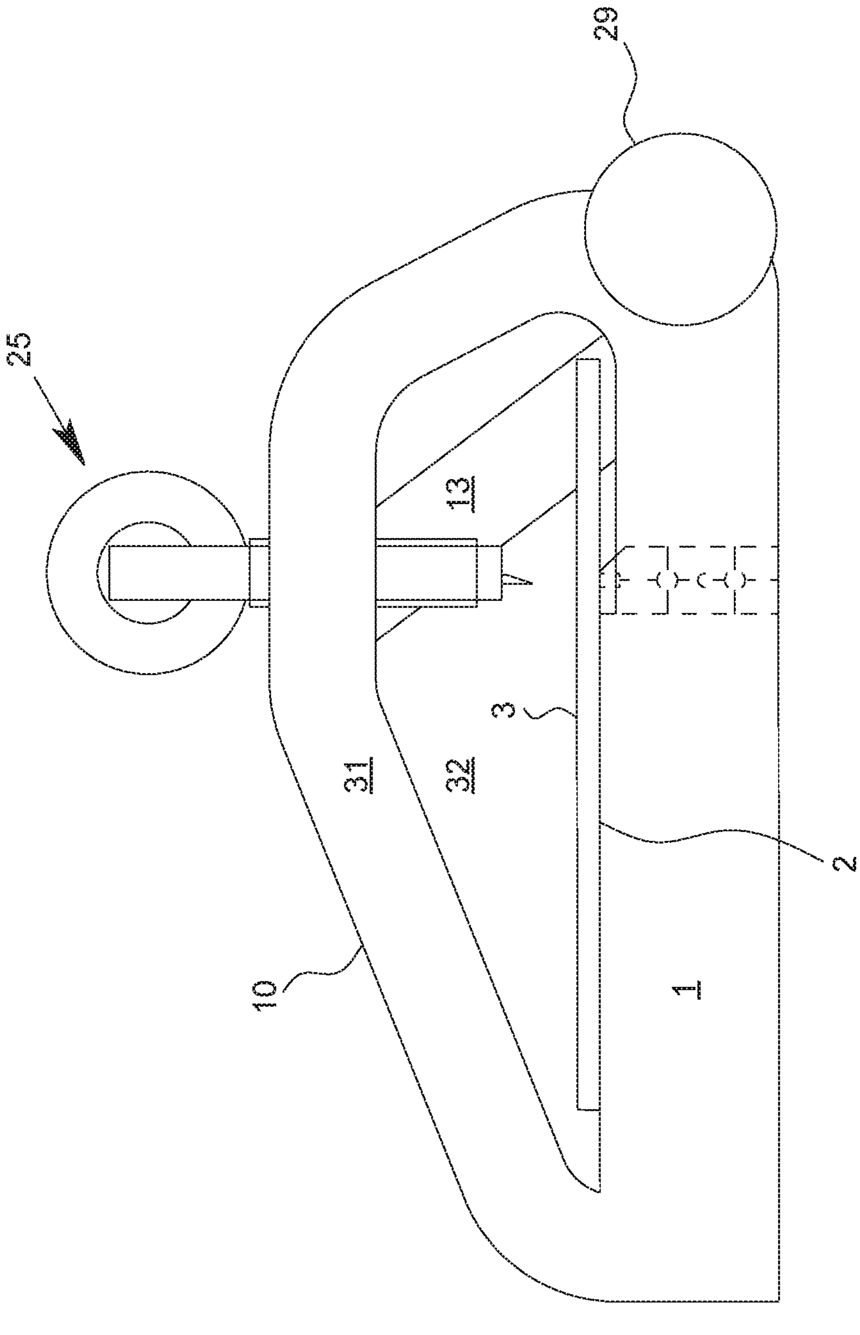
FIG. 4A A side view of an apparatus according to the invention in accordance with a second embodiment viewed in the longitudinal direction along the cutting edge.
Figure 4B:
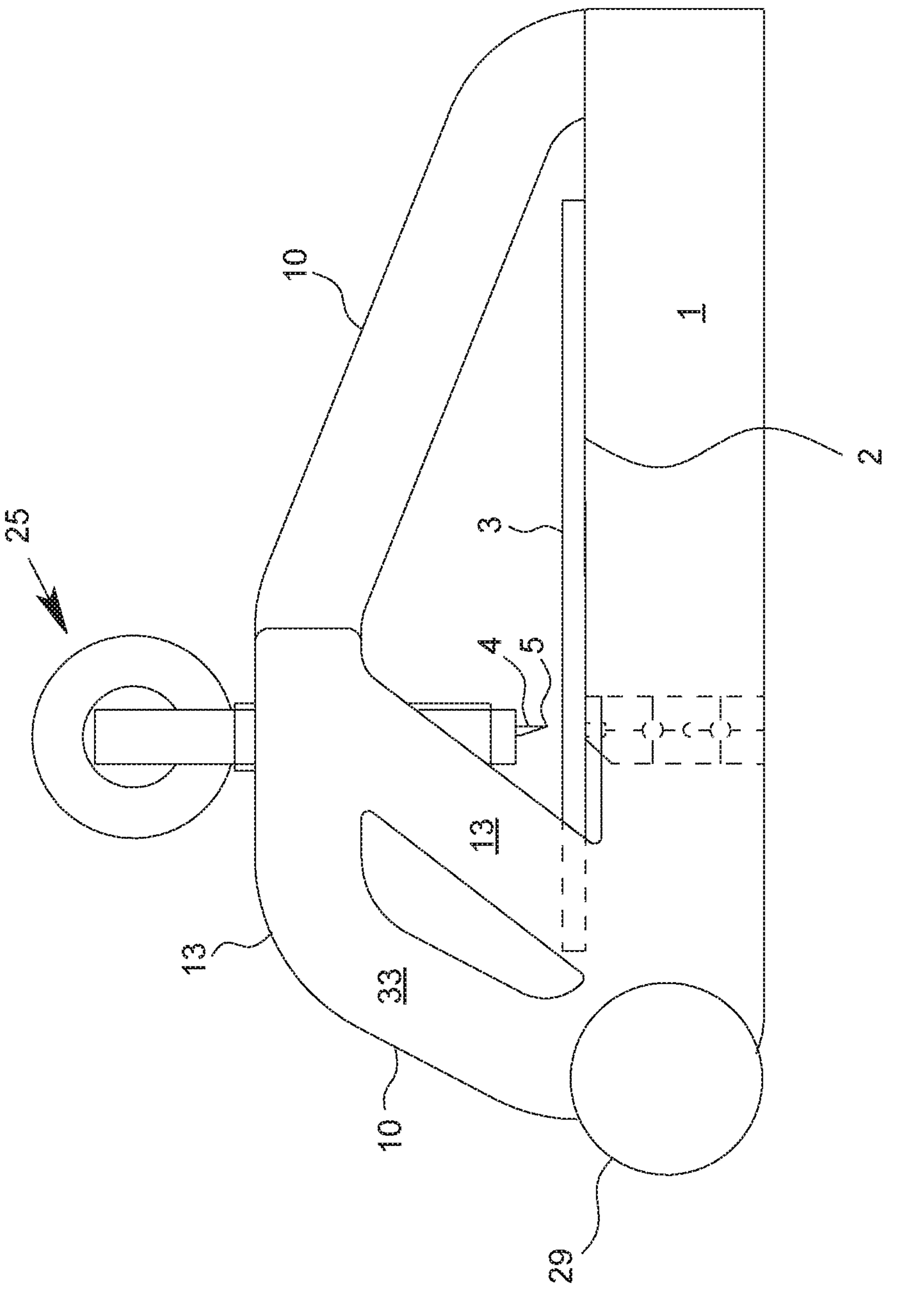
FIG. 4B A side view of the apparatus depicted in FIG. 4A viewed in the opposing direction.
Figure 5:
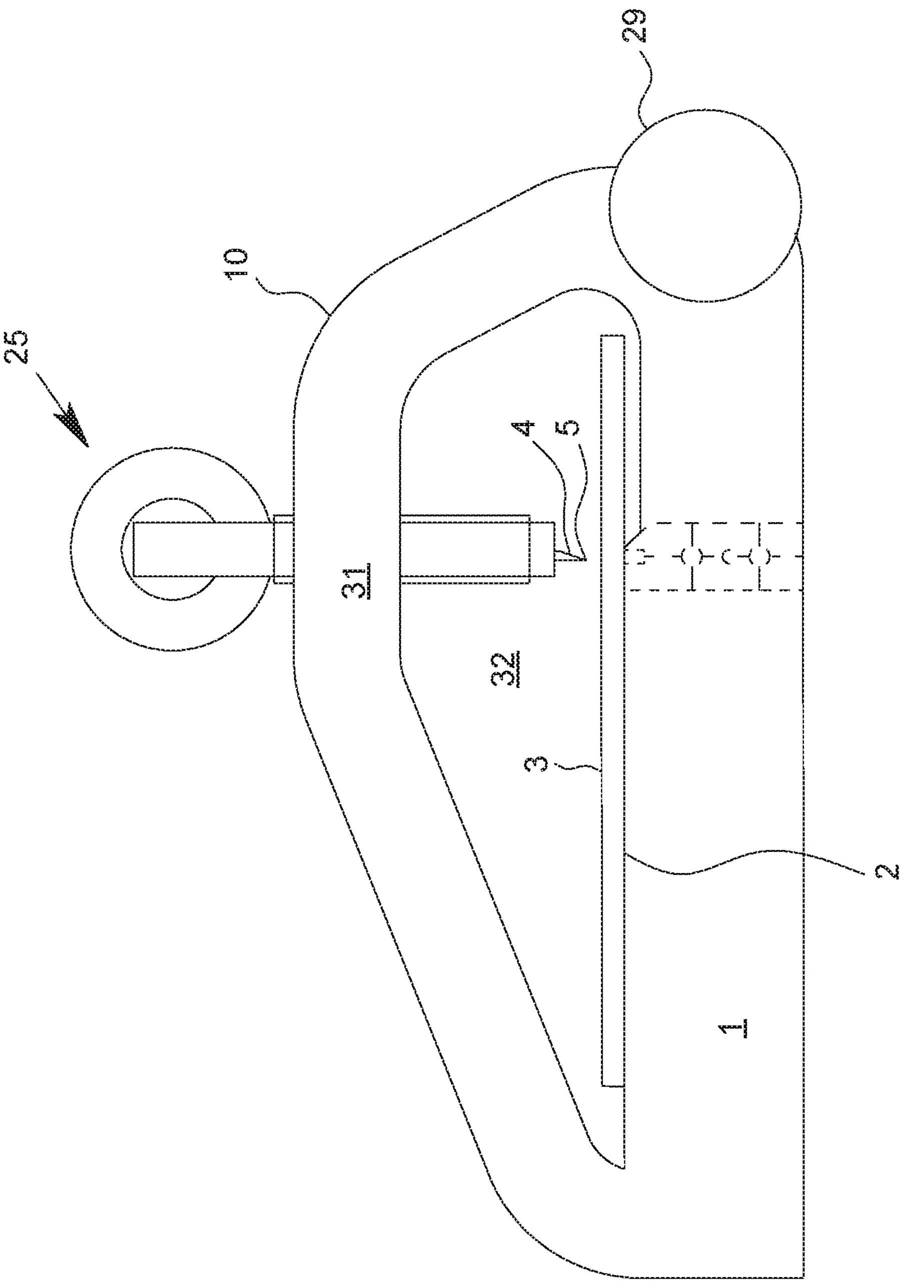
FIG. 5 A side view of an exemplary apparatus according to the invention in accordance with a third embodiment viewed in the direction along the cutting edge.

It is likewise advantageous with regard to the manageability of an apparatus according to the invention if a transport device 29 is provided. The transport device 29 can have rollers for example. The rollers can be arranged on the bracket 10, as depicted in FIG. 1, but an arrangement in the region of the base 1, as depicted in FIGS. 4A to 5 for example, is also possible. Because the cutting work on a coating section or element expediently takes places during laying work of a floor coating as near as possible to the floor location intended for laying, it is useful to be able to move the apparatus with such a transport device 29 in an effort-saving manner. If one assumes that the weight of an apparatus according to the invention can be for example approx. 20 kg, then the transport device 29 produces a substantial reduction in the physical load when moving the apparatus in the region of the floor surface to be processed. Furthermore, a good transportability of an apparatus according to the invention is naturally also meaningful as a part of transportation to and from the respective job site.

Because of the C-shaped design of the bracket 10 and the resulting free spaces beneath the guides 8 between the brackets 10 and guides 8, on the one hand, and the base 1 of the supporting surface 2, on the other hand, the embodiment shown in FIG. 1 features the greatest flexibility of the embodiments shown with respect to the various possibilities of allowing a to-be-cut coating 3 to protrude beyond the apparatus. On the other hand, the embodiment depicted in FIGS. 4A and 4B is restricted in terms of the placeability of a to-be-cut coating 3 on the supporting surface 2 due to the bow-shaped design of the region 31 of one of the brackets 10. Though the coating 3 can protrude laterally through the opening defined between the base 1 and the bow-shaped region 31 beyond the outer side of the bracket 10, the dimensions of the coating 3 are restricted, however, in the direction running transverse to the cutting edge 5 by the connection of the region 31 to the base 1.

The apparatus shown in FIGS. 4A and 4B is embodied to be asymmetrical in order to nevertheless guarantee the most versatile possible usability of the apparatus. In concrete terms, this means that one of the brackets 10 features the described bow-shaped region 31, while the opposing bracket 10 has a C-shaped region 13. The C-shaped region 13 is preferably supplemented by an additional region 33 to reinforce the bracket 10. This design is supposed to ensure that the apparatus features a comparable rigidity in the region of both brackets 10. In the case of a bow-shaped region 31, this makes it possible to achieve a higher rigidity with a lower weight because of the bow shape. This must then be offset by greater material thicknesses or appropriate regions 33 to reinforce the C-shaped bracket 10 on the other side of the apparatus. In this respect, the apparatus shown in FIGS. 4A and 4B constitutes a compromise of versatility and the weight-to-rigidity ratio.

The embodiment shown in FIG. 5 finally has a bracket 10 on both sides of the apparatus, each of which has a bow-shaped region 31. The bow-shaped regions 31 each define together with the base 1 an opening 32 on the respective side of the apparatus, through which the coating 3 can protrude beyond the outer side of the bracket as an extension of the cutting edge 5. In doing so, the bow-shaped regions 31 of the brackets 10 in this embodiment define the possible dimensions of the coating 3 in the region of both sides of the apparatus. As a result, when compared to the other embodiments, even though the embodiment depicted in FIG. 5 has the lowest versatility with respect to possible coating dimensions and the cutting pattern, in exchange it has the best ratio of weight and rigidity.

Figure 6:
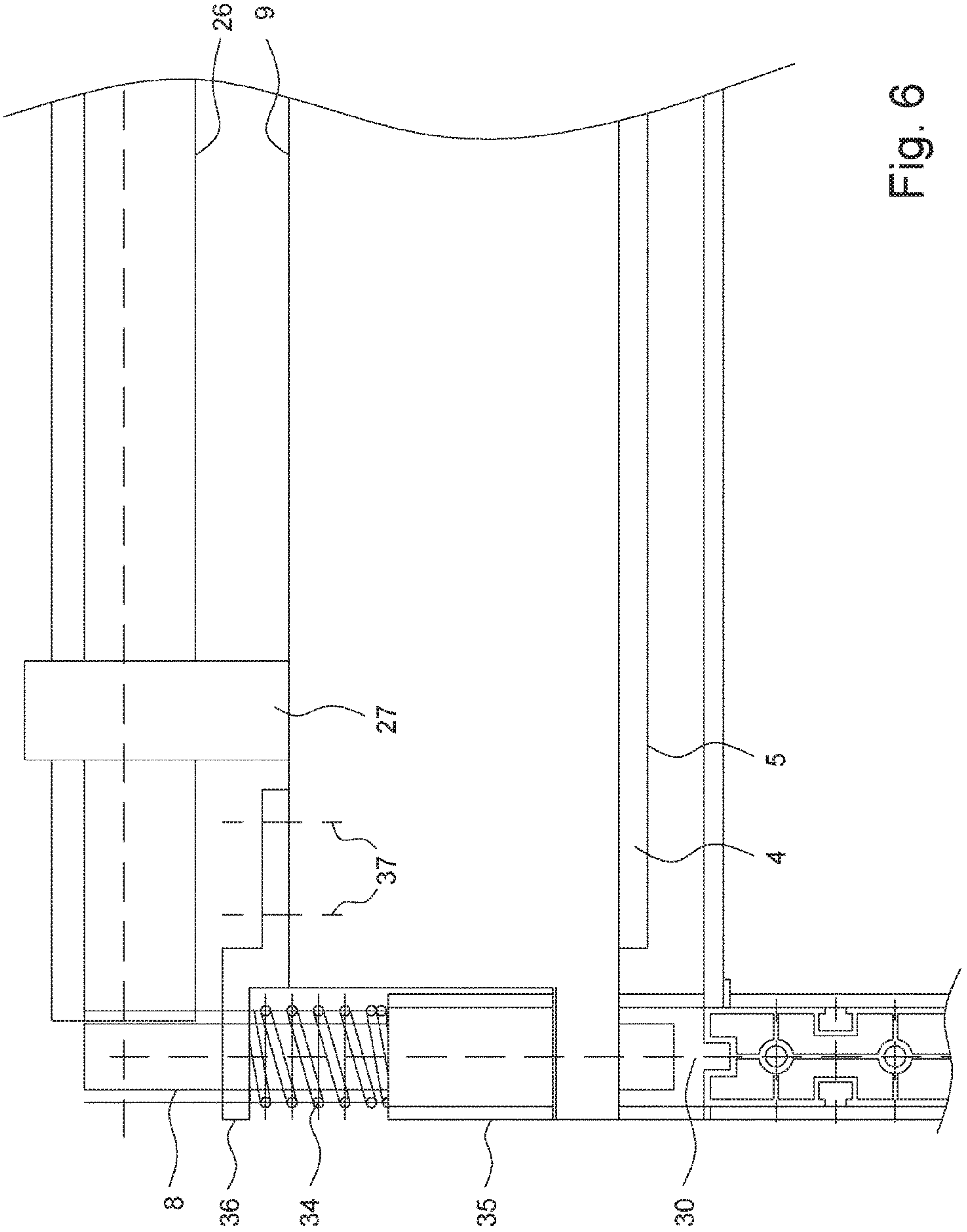
FIG. 6 A partial sectional view of an apparatus according to the invention viewed in the horizontal direction at a right angle to the cutting edge.

An embodiment with an advantageous restoring element 34 is depicted in FIG. 6. The restoring element 34 is thereby arranged above the extension of the cutting edge 5 on the guide device 8 and is configured as a compression spring. Due to this arrangement and the configuration as a compression spring, a tilting of the blade holder 9 and the guide device 8 based on the forces exerted by the restoring element 34 is prevented. This is due to the fact that the initiation of force by the restoring element 34 and the guidance of the blade 4 by the blade holder 9 occur in the same movement plane. The apparatus according to the invention preferably thereby has, as depicted, an abutment element 35, which serves as an abutment for the restoring force exerted by the restoring element 34. Moreover, a region 36 of the blade holder 9 is configured such that it absorbs the restoring force of the restoring element 34.

In the depicted example, the region 36 is advantageously connected to the blade holder 9 in a detachable manner, as indicated in FIG. 6. The detachable connection can be realized by connecting means 37 indicated by dashes in FIG. 6. Because of the detachable connection between the region 36 and the blade holder 9, it is possible to remove the region 36 from the blade holder 9 for assembly or disassembly purposes.

The blade holder 9 with the region 36 thereby extends along the guide device 8 over a height, which is selected to be large enough to be able to arrange the restoring element 34 in the region of this vertical extension. The abutment element 35 can also be advantageously arranged in the region of the vertical extension. As a result, it is possible to arrange a compression spring above the extension of the cutting edge in the movement plane of the blade 4 or the blade holder 9, without the restoring element and/or the abutment element 35 taking up installation space beneath the blade holder 9, which would come at the expense of the installation space available for the free space 30.

LIST OF REFERENCE CHARACTERS

1 Base
2 Supporting surface
3 Coating
4 Blade
5 Cutting edge
6 Profile rail
7 Flat element
8 Guide device
9 Blade holder
10 Bracket
11 Connection profile
12 Fastening element
13 Region of the bracket, C-shaped
14 Region of the bracket, connected to profile rail
15 Transverse profile
16 Limit stop element
17 Chamfer
18 Chamfer
19 Extension module
20 Connecting element
21 Additional cutting edge
22 Limit stop
23 Receiving means
24 Adjustment device
25 Actuating device
26 Axis
27 Pressure disks
28 Receptacle for an actuating element
29 Transport device
30 Free space
31 Region of the bracket, bow-shaped
32 Opening
33 Region of the bracket for reinforcement
34 Restoring element
35 Abutment element
36 Region
37 Connecting mean

The invention claimed is:

1. An apparatus for cutting elongated elastic coatings, the apparatus comprising a base with a supporting surface for supporting the elongated elastic coating to be cut and a blade with a cutting edge for cutting the elongated elastic coating, wherein the blade is mounted on a blade body that is movable towards the base by two guide devices that are connected to the base by two brackets that are separate from one another to the base, wherein the apparatus is configured such that during cutting, at least one side edge of the elongated elastic coating can protrudes in a longitudinal direction of the cutting edge beyond a longitudinally outer side of at least one of the brackets and beyond a longitudinally outer side of the cutting edge.

2. The apparatus according to claim 1, wherein a free space for accommodating the coating is provided between the bracket and the base.

3. The apparatus according to claim 1, wherein a region of the bracket and a region of the base connected to the bracket has, as viewed in the longitudinal direction of the cutting edge, one of a C-shaped cross-sectional region and a closed cross section with an opening arranged, as viewed, in the longitudinal direction of the cutting edge.

4. The apparatus according to claim 1, wherein the apparatus is configured such that a view of the cutting edge is provided through a chamfer, at an angle of at least 45° between a line of sight and a plane of the supporting surface.

5. The apparatus according to claim 1, wherein the blade is configured in a region of the blade in the longitudinal direction such that a material thickness of the blade is reduced at least in a region of the cutting edge towards an end of the cutting edge.

6. The apparatus according to claim 1, wherein the supporting surface of the base, has a limit stop that is oriented parallel to the cutting edge and is adjustable to a horizontal alignment of the coating on the supporting surface.

7. The apparatus according to claim 1, wherein the supporting surface of the base, is configured such that the coating bends along a cutting line to reduce material stresses in the coating during cutting, and has a step in a region of the cutting edge.

8. The apparatus according to claim 1, wherein at least one adjustment device is provided on the guide device for adjusting parallelism therebetween, the supporting surface and a limit stop element provided in a region of the supporting surface for abutting the cutting edge during cutting.

9. The apparatus according to claim 1, wherein an actuating element is provided, which can be arranged along a direction parallel to the cutting edge at different positions.

10. The apparatus according to claim 1, wherein a restoring element is provided, in the form of a compression spring, configured for moving the cutting edge away from the base, which is arranged above the extension of the cutting edge.

11. The apparatus according to claim 1, wherein a free space for accommodating the elongated elastic coating is provided between the guide device and the base.

12. The apparatus according to claim 2, wherein a region of the bracket and a region of the base connected to the bracket has, as viewed in the longitudinal direction of the cutting edge, one of a C-shaped cross-sectional region and a closed cross section with an opening arranged, as viewed, in the longitudinal direction of the cutting edge.

13. The apparatus according to claim 1, wherein the apparatus is configured such that a view of the cutting edge is provided through a rounding of a lower edge of a blade holder, at an angle of at least 45° between a line of sight and a plane of the supporting surface.

14. The apparatus according to claim 5, wherein an additional cutting edge that runs at a substantially right angle to the cutting edge is provided on the blade.

15. The apparatus according to claim 1, wherein the supporting surface of the base, has a limit stop that is oriented at a right angle to the cutting edge and is adjustable to a horizontal alignment of the coating on the supporting surface.

16. The apparatus according to claim 1, wherein the supporting surface of the base, is configured such that the coating bends along a cutting line to reduce material stresses in the coating during cutting, and has a chamfer in a region of the cutting edge.

17. An apparatus for cutting elongated elastic coatings, the apparatus comprising:

a base having a supporting surface for supporting an elongated elastic coating to be cut;
a blade having a cutting edge for cutting the elongated elastic coating, the cutting edge extending in a longitudinal direction;
a blade body that supports the blade;
a pair of guide devices that support the blade body with respect to the base so that the blade body and blade are movable towards the base; and
a pair of brackets that support the pair of guide devices, respectively, wherein the pair of brackets extend from the base to the pair of guide devices, and wherein the pair of brackets are spaced apart and separate from each other from the base to the pair of guide devices;
wherein the apparatus is configured such that during cutting, at least one side edge of the elongated elastic coating can protrude in the longitudinal direction beyond a longitudinally outer side of at least one of the pair of brackets and beyond a longitudinally outer side of the cutting edge.

* * * * *